United States Patent
Spjut

(10) Patent No.: US 7,464,893 B2
(45) Date of Patent: Dec. 16, 2008

(54) METHOD OF USING A CORD HOLDER

(76) Inventor: Per Spjut, Helmer Osslundsvagen 1, 864 32 Matfors (SE)

( * ) Notice: Subject to any disclaimer, the term of this patent is extended or adjusted under 35 U.S.C. 154(b) by 0 days.

(21) Appl. No.: 11/756,330

(22) Filed: May 31, 2007

(65) Prior Publication Data

US 2008/0001014 A1   Jan. 3, 2008

Related U.S. Application Data

(60) Provisional application No. 60/806,289, filed on Jun. 30, 2006.

(51) Int. Cl.
*B65H 75/38* (2006.01)
(52) U.S. Cl. .................... 242/385.4; 242/379
(58) Field of Classification Search ........... 242/378, 242/378.1, 378.3, 378.4, 376, 379, 379.2, 242/398, 385, 385.4
See application file for complete search history.

(56) References Cited

U.S. PATENT DOCUMENTS

| | | | | |
|---|---|---|---|---|
| 3,084,886 A | * | 4/1963 | Bastow | 242/385.4 |
| 5,509,616 A | * | 4/1996 | Millen et al. | 242/385.4 |
| 5,669,571 A | * | 9/1997 | Graybill | 242/385.4 |
| 6,328,243 B1 | * | 12/2001 | Yamamoto | 242/378.1 |
| 7,093,783 B2 | * | 8/2006 | Warren et al. | 242/385.4 |
| 7,106,301 B2 | * | 9/2006 | Smith et al. | 242/385 |
| 7,147,177 B2 | * | 12/2006 | Yen | 242/385.4 |
| 2002/0040945 A1 | * | 4/2002 | Stepancich et al. | 242/385.4 |
| 2003/0209625 A1 | * | 11/2003 | Alson | 242/398 |
| 2005/0145739 A1 | * | 7/2005 | Warren et al. | 242/378.3 |

* cited by examiner

*Primary Examiner*—William A Rivera
(74) *Attorney, Agent, or Firm*—Fasth Law Offices; Rolf Fasth

(57) ABSTRACT

The method is for using a cord holder. A cord holder has a bottom cover and a removable top cover with a spring bracket disposed therebetween. The removable top cover is removed from the bottom cover without removing a spring from a spring bracket so that the spring remains in the spring bracket and the bottom cover while the top cover is removed. A cord is placed around a first spacer and a second spacer of the spring bracket. A knob is pressed to permit a spring, disposed inside the spring bracket, to roll up the cord.

6 Claims, 4 Drawing Sheets

METHOD OF USING A CORD HOLDER

PRIOR APPLICATION

This U.S. patent application claims priority from U.S. provisional patent application Ser. No. 60/806,289, filed 30 Jun. 2006.

TECHNICAL FIELD

The method relates to using a cord holder such as a cord holder that may, for example, be used to roll up and roll out a flexible cord.

BACKGROUND OF INVENTION

A variety of cords and wires are commonly used to connect electronic equipment. For example, cords are used to connect music players/mobile phone with headsets or headphones. Cords are also used to connect various components of stereo and computer equipment. These cords sometimes get in the way and there is a need to adjust the length of the cords to the specific application. There are roll-up devices provided by the music player manufacturers so the roll-up devices are made to be permanently used together the manufacturer's own music player/mobile phone. These devices are often permanently connected to the headset cord so that the consumer cannot select his/her own preferred headset when such the roll-up devices. In other words, the user cannot use an existing headset with the currently available cord roll-up devices. There is a need for a method of using a cord holder that permits the user to select his/her preferred headset, or any other electronic equipment, while having access to the roll-up function of a cord holder.

SUMMARY OF INVENTION

The method of the present invention provides a solution to the above-outlined problems. More particularly, the method is for using a cord holder. A cord holder has a bottom cover and a removable top cover with a spring bracket disposed therebetween. The removable top cover may be removed from the bottom cover without removing a spring from a spring bracket so that the spring remains in the spring bracket and the bottom cover while the top cover is removed. A cord is placed around a first spacer and a second spacer of the spring bracket. A knob is pressed to permit a spring, disposed inside the spring bracket, to roll up the cord. It is possible to tension the spring even when the top cover and the cord are removed from the spring bracket since the spring is disposed in the interior space under the spring bracket.

DETAILED DESCRIPTION

Figure 1:
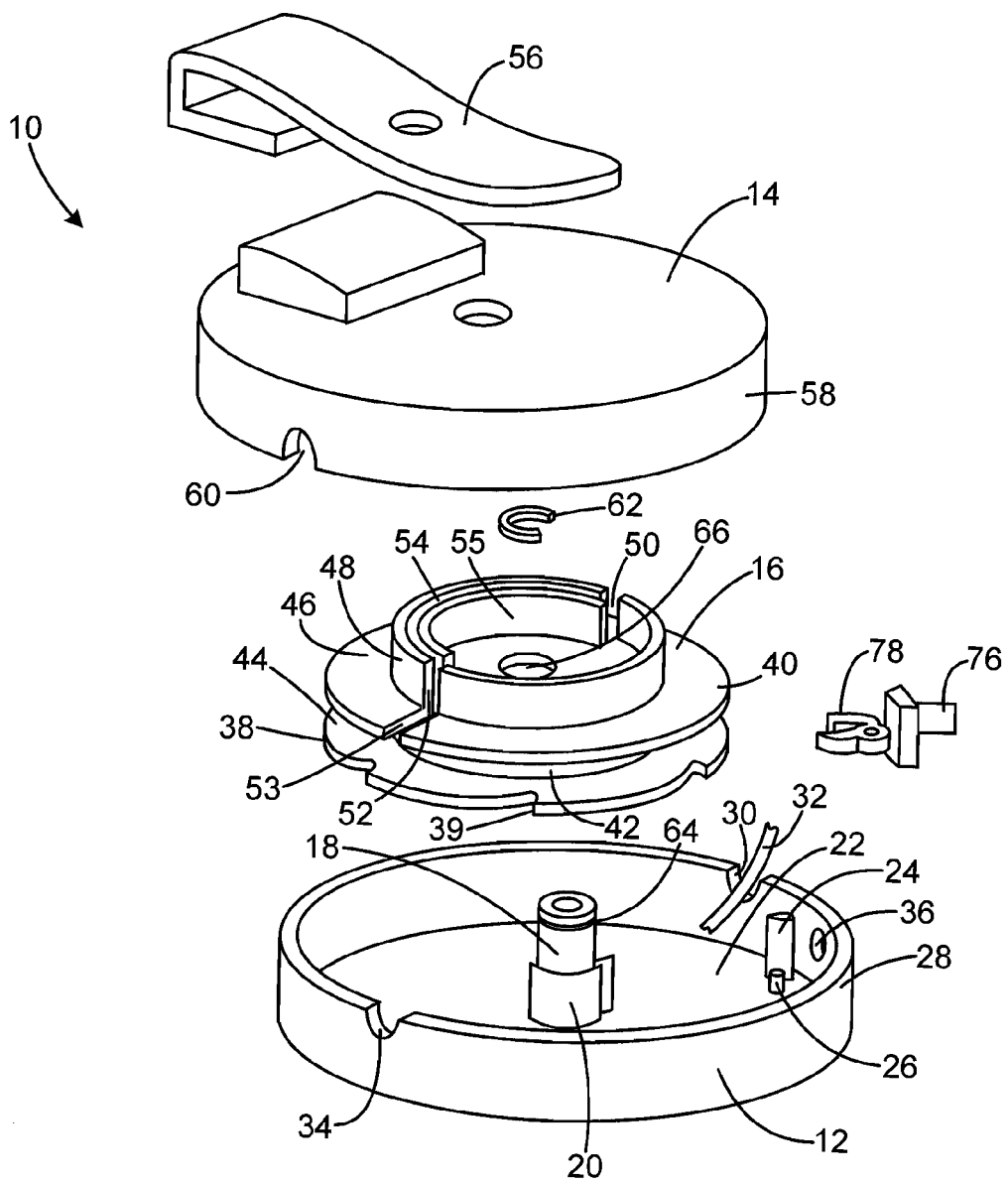
FIG. 1 is an exploded perspective view of the cord holder of the present invention.

With reference to FIGS. 1-4, the cord holder 10 of the present invention has a round bottom cover 12 and a round top cover 14 with a spring bracket 16 placed therebetween. As explained in detail below, it is important that the top cover 14 is easily removable and not glued to the bottom cover so that the user may place any suitable cord inside the spring bracket and assemble the cord holder 10.

The bottom cover 12 has a central upwardly protruding axle 18. A spring holder 20 is disposed next to the axle 18. A bottom surface 22 of the bottom cover 12 has a spring holding protrusion 24 for holding one end of a spring and a bracket-engaging unit 26 for permitting a rewindable knob 76 to be inserted into and serve as an axle for the knob 76. Both the protrusion 24 and the engaging unit 26 are disposed close to a peripheral end wall 28. A cavity 30 is defined in the end wall for receiving a cord 32 and a cavity 34 is defined at an opposite end diametrically opposite the cavity 30. The cord may be any suitable bendable elongate member such as cables, cords and wires. The end wall 28 also has a knob receiving opening 36 defined therein.

The spring bracket 16 has a bottom cog 38 and a disc 40 held separate by a first centrally mounted spacer 42 so that a groove 44 is defined therein. The cog 38 has teeth 39 so that the cog may be easily moved in one direction but there is a resistance to move the cog in the opposite direction when the teeth are engaged.

A second groove 46 is defined above the disc 40. The disc 40 has a second spacer 48 centrally mounted thereon. The second spacer 48 has a first slit 50 and a second slit 52 defined in the sidewall thereof. The slit 52 is aligned with a slit 53 of the disc 40 so that the cord 32 may extend between the top groove 46 and the bottom groove 44 via the slit 53. A half circular member 55 is disposed inside the spacer 48 so that a space 54 is defined therebetween to receive the cord 32. In this way, about half the length of the cord may be rolled up around the second spacer 48 and the other half the length may be rolled up around the first spacer 42.

An e-ring 62 may be used to lock the spring bracket 16 to the bottom cover 12 by snapping the e-ring 62 into a cavity 64 defined at a top of the axle 18 when the axle is inserted trough a central opening 66 of the spring bracket 16. The e-ring 62 is important because the top cover 14 and the cord 32 can be removed without the locking mechanism and spring popping out.

The top cover 14 has a clip 56 is mounted to a top surface of the top cover 14. The clip 56 may be used to hang the cord holder 10 to items such as an outside, loudspeaker, pocket or suit jacket or any other suitable item. A sidewall 58 has a cavity 60 defined therein that cooperates with the cavity 34 when the top cover 14 is placed over the bottom cover 12.

As indicated above, the rewindable knob 76 may be used to roll up and pull out the cord 32. It is not necessary to use the knob when pulling out the knob since it is spring biased by the spring. The knob has an engagement member 78 that engages the teeth 39 when the knob is placed in the opening 36. The knob 76 may be pushed in and pulled out to engage and disengage the teeth 39. Because the knob is spring biased it is not necessary for the user to pull out the knob but only to press the knob when the cord is to be pulled out. As a result the cord 32 can be automatically rolled in as a result of a tension of a spring, as explained below. The cord 32 may be pulled out by simply pulling on the cord 32.

Figure 2:
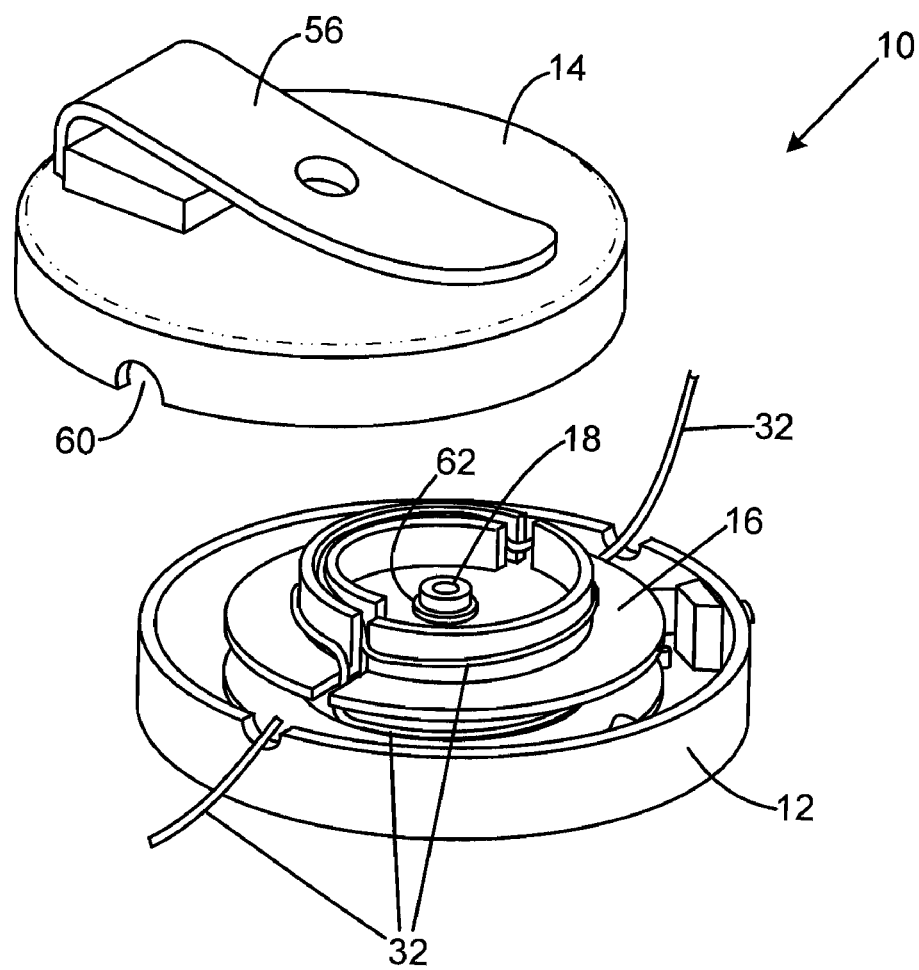
FIG. 2 is a perspective view of the cord holder of the present invention with the top cover removed.

As best shown in FIG. 2, the spring bracket 16 may be placed in the bottom cover 12 and held in place by locking the e-ring 62 to the groove 64. The cord 32 may be pulled in via the cavity 34 and in through the slit 50. The cord may then extend around the half moon shaped gap 54 and out the slit 52 to be rolled around the second spacer 48 so that a headset, or any other end device such as a plug, may be placed right outside the cavity 34. The remaining half of the cord 32 may then extend through the bottom slit 53 and rolled up on the first spacer 42 so that the contact of the cord 32 may be positioned directly outside the cavity 30.

Figure 3:
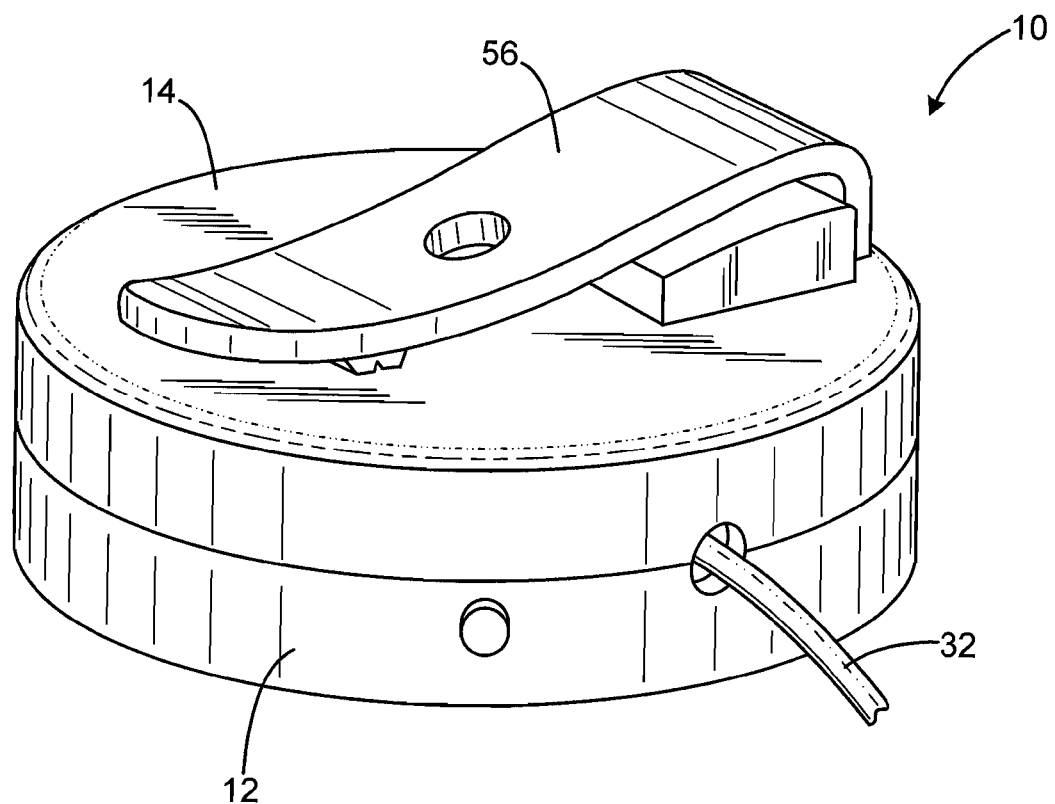
FIG. 3 is a perspective view of an assembled cord holder of the present invention.
Figure 4:
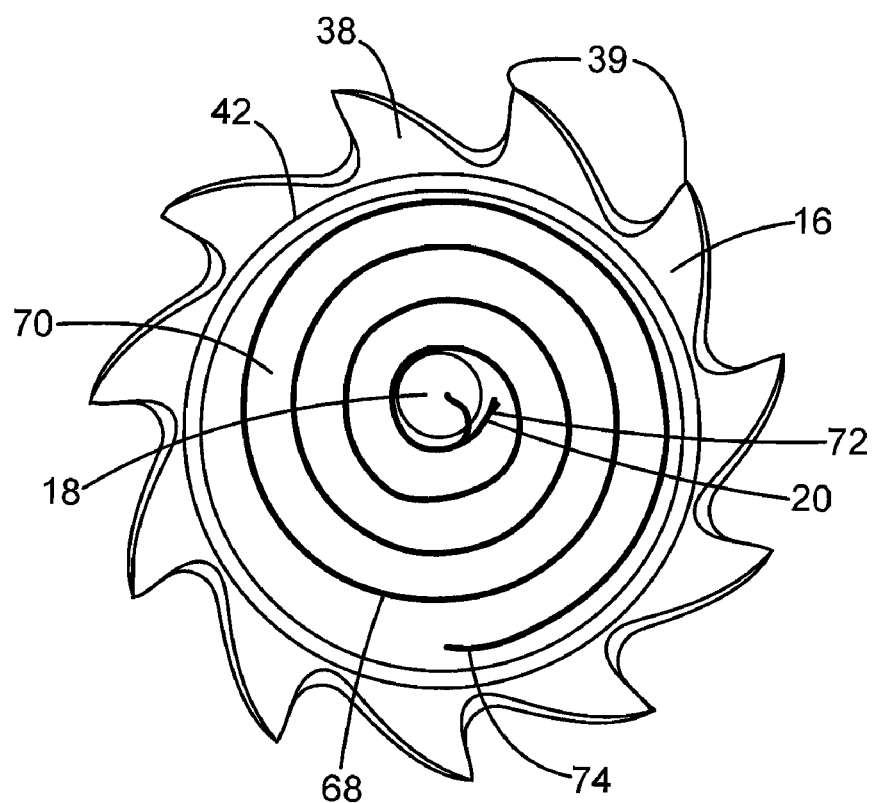
FIG. 4 is a bottom view of the spring bracket with a spring mounted therein.

FIG. 3 shows the assembled cord holder 10 with a portion of the cord 32 sticking out. FIG. 4 shows a bottom view of the spring bracket 16 with a spring 68 disposed inside an interior space 70 defined inside the spacer 42. One end 72 of the spring 68 is attached to the holder 20 at the axle 18 while an opposite end 74 is attached to the spacer 42. By turning the spring bracket 16 relative to the axle 18 the spring 68 may be tensioned. As indicated above, the teeth 39 prevent the release of the spring tension. By pressing the knob 76, the teeth 39 of the spring bracket 16 are disengaged or released so that the spring 68 causes the cord to be rolled up until fully rolled up or until the knob 76 is no longer pushed in so that the teeth are locked again and the spring bracket stops spinning.

One important feature of the cord holder 10 of the present invention is that the user can easily and conveniently adjust the length of any cord 32. The use for headsets is merely an illustrative example. The cord holder may be used to hold any cord or wire such as loudspeaker cords or any other electrical wire or cord. Another important feature is that the spring 68 is positioned away from the cord 32 so that the spring does not interfere with any removal or inserting of the cord into the spring bracket 16. It is even possible to tension the spring 68 while the top cover 14 and the cord 32 are removed from the spring bracket 16. The user simply rotates the spring bracket 16 relative to the bottom cover 12 to tension the spring 68 disposed inside the interior space 70.

While the present invention has been described in accordance with preferred compositions and embodiments, it is to be understood that certain substitutions and alterations may be made thereto without departing from the spirit and scope of the following claims.

The invention claimed is:

1. A method of using a cord holder, comprising:
providing a cord and a cord holder having a bottom cover and a removable top cover with a spring bracket disposed therebetween, the cord holder comprising a top spacer, a bottom spacer and a bottom cog having teeth, the top spacer having a half-circular member disposed inside the spacer so that a space is defined between an inside of the top spacer and an outside of the half-circular member to receive the cord, the top spacer having a first slit and a second slit defined therein, the first slit being diametrically opposite the first slit, the cord holder having a disc disposed between the top spacer and the bottom spacer, the disc having a slit defined therein;
engaging the teeth of the bottom cog with an engagement member of a knob placed inside an opening of a bottom cover of the cord holder;
removing the removable top cover from the bottom cover without removing a spring from the spring bracket so that the spring remains in the spring bracket and the bottom cover while the top cover is removed;
placing the cord around the bottom spacer and extending the cord through the slit of the disc and around the top spacer;
extending the cord through the second slit of the top spacer into the space between the half-circular member and the top spacer and out through the first slit of the top spacer;
pressing the knob to disengage the engagement member of the knob from the teeth of the bottom cog to permit the spring, disposed inside the spring bracket, to roll up the cord.

2. The method according to claim 1 wherein the method further comprises removing the top cover and change cord without removing any locking mechanism in operative engagement with the spring.

3. The method according to claim 1 wherein the method further comprises having the cord holder with a clip.

4. The method according to claim 1 wherein the method further comprises placing the spring inside an interior cavity in an underside of the spring bracket.

5. The method according to claim 1 wherein the method further comprises tensioning the spring while the cord is removed from the spring bracket.

6. The method according to claim 1 wherein the method further comprises tensioning the spring while the top cover is removed from the bottom cover.

* * * * *